United States Patent

Wang et al.

[11] Patent Number: 5,900,045
[45] Date of Patent: May 4, 1999

[54] METHOD AND APPARATUS FOR ELIMINATING AIR BUBBLES FROM A LIQUID DISPENSING LINE

[75] Inventors: Wen-Shyan Wang, Tao-Yuan Shyuan; Shih-Hung Lu, Taipei Shyuan, both of Taiwan

[73] Assignee: Taiwan Semiconductor Manufacturing Co.Ltd., Hsin-Chu, Taiwan

[21] Appl. No.: 08/843,567

[22] Filed: Apr. 18, 1997

[51] Int. Cl.⁶ .................................................. B01D 19/00
[52] U.S. Cl. ................ 95/241; 95/243; 95/254; 96/155
[58] Field of Search .............. 95/241, 243, 254; 96/155, 156, 157, 158, 168, 170, 174, 220, 6, 219; 426/487; 427/97, 126.2, 444, 561; 438/758, 780, 782

[56] References Cited

U.S. PATENT DOCUMENTS

| | | | |
|---|---|---|---|
| 1,846,376 | 2/1932 | Walker | 95/241 |
| 3,362,136 | 1/1968 | Burnham, Sr. et al. | 96/158 |
| 3,713,274 | 1/1973 | Sauer et al. | 96/174 |
| 3,853,500 | 12/1974 | Gassmann et al. | 96/158 |
| 4,080,288 | 3/1978 | Pilson | 96/6 |
| 4,987,852 | 1/1991 | Sakai et al. | 96/157 |
| 5,425,803 | 6/1995 | Van Schravendijk et al. | 96/6 |
| 5,584,416 | 12/1996 | Florian | 96/157 |
| 5,746,808 | 5/1998 | Hellenschmidt | 96/220 |
| 5,792,237 | 8/1998 | Hung et al. | 95/254 |

FOREIGN PATENT DOCUMENTS

| | | | |
|---|---|---|---|
| 669102 | 11/1929 | France | 96/155 |
| 60-61011 | 4/1985 | Japan | 96/174 |
| 63-16086 | 1/1988 | Japan | 96/157 |
| 63-178843 | 7/1988 | Japan | 95/241 |
| 1-189304 | 7/1989 | Japan | 96/155 |
| 2158157 | 11/1985 | United Kingdom | 95/241 |

*Primary Examiner*—C. Scott Bushey
*Attorney, Agent, or Firm*—Tung & Associates

[57] ABSTRACT

The present invention discloses a method and apparatus for eliminating air bubbles from a liquid dispensing line by utilizing an air bubble tank positioned and connected in fluid communication between a liquid reservoir and an electric pump for feeding the liquid. The air bubble tank cumulates air bubbles in an upper portion of the tank cavity and allows a liquid flow which is substantially free of air bubbles to be outputted from an outlet positioned adjacent to the bottom of the tank to a process machine, while the air bubbles are exhausted out of the tank on a predetermined frequency.

18 Claims, 1 Drawing Sheet

METHOD AND APPARATUS FOR ELIMINATING AIR BUBBLES FROM A LIQUID DISPENSING LINE

FIELD OF THE INVENTION

The present invention generally relates to a method and apparatus for eliminating air bubbles from a liquid dispensing line and more particularly, relates to a method and apparatus for removing air bubbles from a liquid dispensing line by installing a bubble tank between a liquid reservoir and a pump such that air bubbles can be separated from the liquid in the bubble tank and exhausted through an air bubble outlet.

BACKGROUND OF THE INVENTION

In semiconductor processing, a semi-conducting wafer must be processed in a multiplicity of fabrication steps, i.e., as many as several hundred steps, in order to complete the manufacturing of an IC device. These processing steps may include etching, cleaning, deposition and various other processing procedures. A variety of chemicals, including various liquids and gases may be used, in the processing steps either to etch a specific feature on the IC chip, to clean after certain processing steps, to deposit layers from reactant chemicals, or to carry out other necessary processing steps.

For instance, in photomasking and metal cleaning processes, a variety of speciality chemicals are used. An important requirement for such speciality chemicals, i.e., photoresists, developers, spin-on glass and polyimide is the transporting and storage of the materials. In the case of a photoresist material, the photosensitivity and the lifetime of such material depends on its storage temperature. It is important to maintain such materials within a specification of 5 to 20° C. for a photoresist/developer and −20 to 10° C. for spin-on glass/polyimide materials.

The transporting of these speciality chemicals, especially liquids, or the delivery from a storage reservoir (i.e., a holding tank) to a processing chamber where the liquid is used is another important aspect of the fabrication process. A process liquid, such as that of a photoresist or a developer, can normally be transported in a fluid passage such as a stainless steel tubing by an electrical pump means. One of such conventional liquid delivery system for a photoresist is shown in FIG. 1.

As shown in FIG. 1, a photoresist delivery system 10 is shown in an illustration for the present invention novel method and apparatus. The photoresist delivery system 10 generally consists of a liquid reservoir 12 (or a holding tank), a nitrogen gas inlet 14, and a photoresist solution outlet 16. The nitrogen gas used is normally a dry nitrogen gas to pressurize the liquid reservoir 12. The liquid flow 18 out of the reservoir 12 which is pumped by an electric pump 32 assisted by the nitrogen pressure in the reservoir 12 first enters into a buffer tank 22 through inlet 24. The buffer tank 22 is used to regulate flow from the reservoir 12 and is also capable of separating a small amount of air bubbles in the liquid. A small amount of air bubbles can be exhausted from outlet 26 while liquid is fed through outlet 28 generally located at the bottom of the buffer tank 22 into an air controlled solenoid valve 34. The small amount of air bubbles exits outlet 26 on the buffer tank 22 and enters into a drain tank (not shown) through passageway 36. The air controlled solenoid valve 34 controlled by an air supply 38 regulates the amount of liquid that can be pumped through passageway 42.

In the conventional liquid dispensing line shown in FIG. 1, a second liquid reservoir tank (not shown) can also be used as a back-up supply for feeding into the electric pump 32 connected in parallel with the first liquid reservoir 12. A liquid flow 44 fed from the second liquid reservoir tank (not shown) enters into a second air controlled solenoid valve 46 controlled by the same air source 38 through passageway 48 into the electric pump 32. It should be noted that the first liquid reservoir 12 and the second liquid reservoir operate in an alternating fashion such that the refill or maintenance of one liquid reservoir can be conducted at anytime without interrupting the normal operation of the liquid dispensing line. The dual reservoir system therefore eliminates potential down time of the dispensing line.

The electric pump 32, assisted by dry nitrogen gas 52 pumps liquid flow 54 into a filter device 56. The filter device may also serve as an air bubble filter such that liquid flow 58 containing a small amount of air bubbles may exit the filter at outlet 60 into a drain tank 62. The liquid flow 58 is controlled by another air solenoid valve 64. A flow of the photoresist solution 66, controlled by a flow regulator 68 and a series of air pressure controllers 72 can be fed to a nozzle for the final dispensing of the photoresist solution through passageway 74.

During normal operations, a small amount of air bubbles can be purged out by the buffer tank 22 and the filter 56. However, when a large volume of air bubbles is generated, for instance, during a maintenance procedure of filter replacement or a refill of the photoresist solution in the holding tank 12, the buffer tank 22 and the filter 56 can no longer effectively exhaust the air bubbles. As a result, a flow of the photoresist solution 74 which contains a volume of air bubbles is applied to the surface of a wafer.

When a wafer surface is coated with a photoresist solution, the volume of the photoresist material deposited and the resulting photoresist film formed must be quantitatively controlled to a high accuracy. Since the presence of air bubbles in the photoresist solution decreases the amount of the photoresist material, the available photoresist material that can be applied to the wafer surface is reduced accordingly by the amount of the bubbles. A non-uniform coating and subsequently a defective pattern can be produced on the wafer. The flow regulating valve 68, also called a suckback valve, is designed to shut off the liquid flow or to suckback the flow when bubbles are detected flowing through the passageway 66. However, the valve 68 is not always effective in stopping the air bubbles. Furthermore, valve 68 sometimes causes the photoresist solution to drop onto the wafer surface after a normal dispensing time has lapsed and thus again causing a poor coating of the photoresist material.

It is therefore an object of the present invention to provide a method for eliminating air bubbles from a liquid dispensing line that does not have the drawbacks and shortcomings of the conventional methods.

It is another object of the present invention to provide a method for eliminating air bubbles from a liquid dispensing line by utilizing an air bubble tank positioned and connected in the line for collecting air bubbles in the liquid flow.

It is a further object of the present invention to provide a method for eliminating air bubbles from a liquid dispensing line by utilizing an air bubble tank which is capable of separating air bubbles from a liquid such that the bubbles can be cumulated in an upper portion of the tank for exhausting to the outside of the dispensing system.

It is still another object of the present invention to provide an apparatus for eliminating air bubbles from a liquid dispensing line by utilizing an air bubble tank equipped with a single inlet and two liquid outlets.

It is yet another object of the present invention to provide an apparatus for eliminating air bubbles from a liquid dispensing line which only requires a slight modification of an existing processing equipment.

SUMMARY OF THE INVENTION

In accordance with the present invention, a method and apparatus for eliminating air bubbles from a liquid dispensing line by utilizing an additional air bubble tank in the dispensing line is provided.

In a preferred embodiment, a method for eliminating air bubbles from a liquid dispensing line can be carried out by first providing a bubble tank which has a top surface, a bottom surface that is generally parallel to the top surface, and a cylindrical shaped sidewall connecting the top and the bottom surfaces forming a fluid-tight enclosure, then providing a first liquid inlet and a first liquid outlet on the top surface and a second liquid outlet on or near the bottom surface of the bubble tank, then flowing a liquid flow containing air bubbles into the first liquid inlet to substantially fill a cavity inside the bubble tank such that substantially all air bubbles accumulate in an upper portion of the cavity, then flowing a liquid flow which is substantially free of air bubbles out of the second liquid outlet for dispensing to a process machine, and venting the air bubbles accumulated in the upper portion of the cavity from the first liquid outlet out of the bubble tank.

The present invention is also directed to a bubble tank used for collecting air bubbles from a liquid dispensing line which includes a tank that has a top surface, a bottom surface and a sidewall defining a cavity contained therein, a liquid inlet positioned adjacent to the top surface of the tank for admitting liquid containing air bubbles into the cavity, a first liquid outlet positioned adjacent to the bottom surface of the tank for outputting a liquid flow that is substantially free of air bubbles, and a second liquid outlet positioned adjacent to the top surface of the tank for exhausting the air bubbles.

The present invention is further directed to an apparatus for eliminating air bubbles from a liquid dispensing line which includes a first passage for feeding a liquid containing air bubbles to a bubble tank through a first inlet positioned generally on top of the tank, a bubble tank for holding a liquid and a quantity of air bubbles in a cavity wherein the liquid generally cumulates in a lower portion and the air bubbles generally cumulates in an upper portion of the cavity, a first outlet positioned generally on top of the tank for exhausting air bubbles collected in the upper portion of the cavity, and a second fluid passage for drawing a liquid substantially free of air bubbles through a second outlet positioned generally near the bottom of the tank for dispensing to a process machine.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENTS

The present invention provides a method and apparatus for eliminating air bubbles in a liquid dispensing line by utilizing an air bubble tank positioned and connected between a liquid reservoir and a pump such that substantially all air bubbles are collected in the tank and are then exhausted out of the liquid dispensing system.

Figure 1:
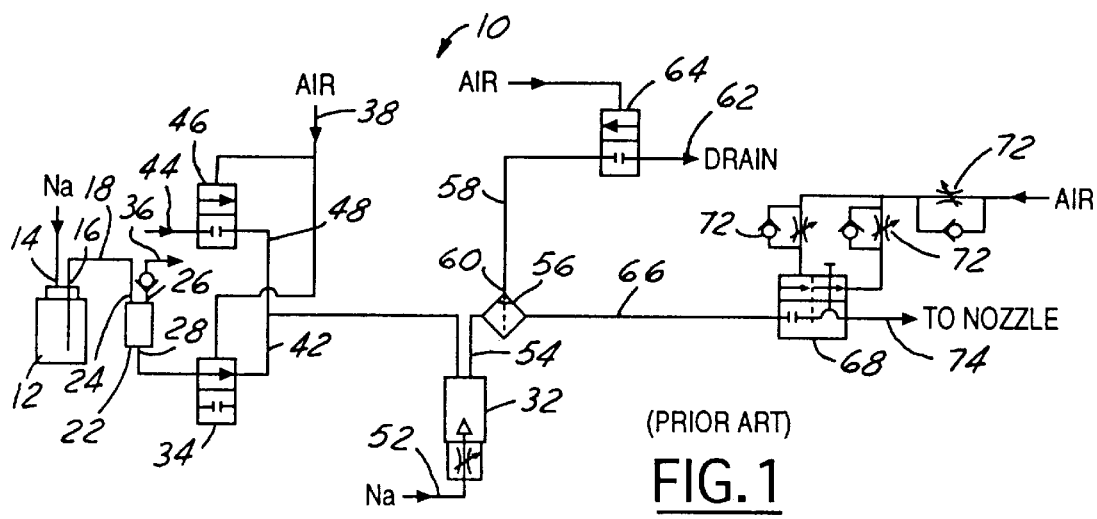
FIG. 1 is a schematic illustrating a conventional liquid dispensing line for a photoresist solution.
Figure 2:
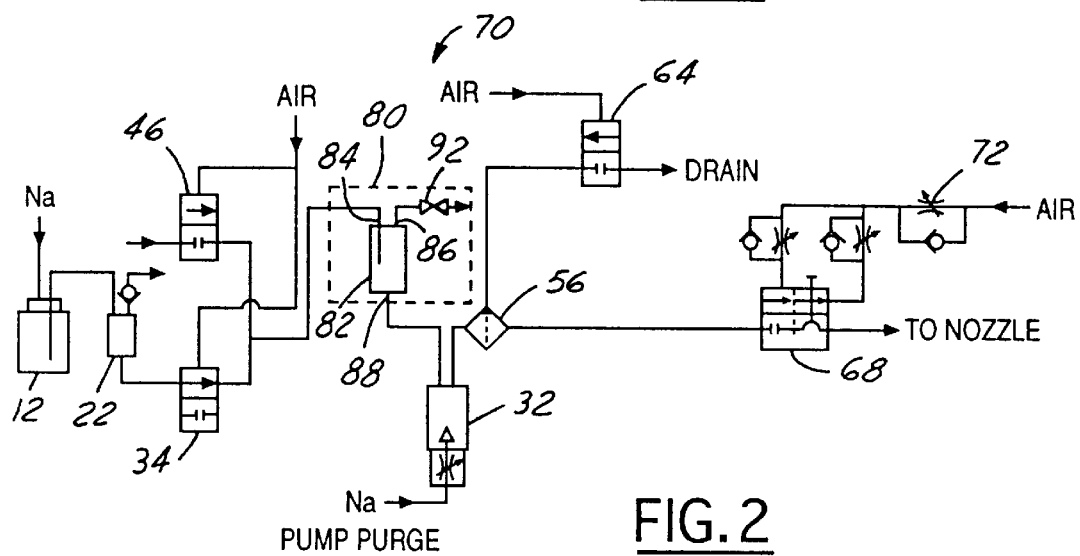
FIG. 2 is a schematic illustrating a present invention liquid dispensing line which includes an air bubble tank system.
Figure 3:
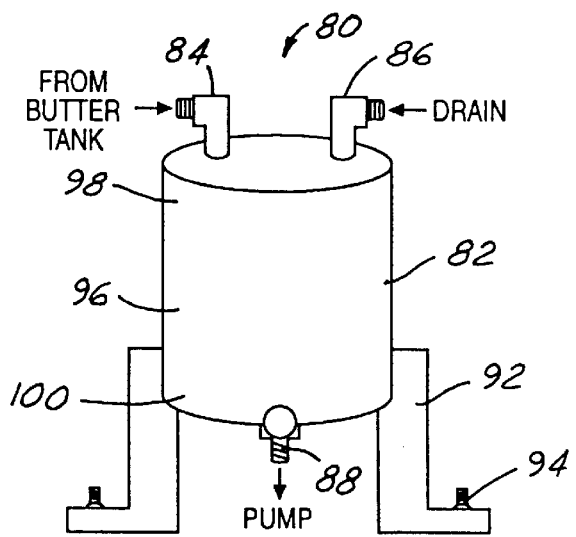
FIG. 3 is an enlarged, perspective view of the air bubble tank shown in FIG. 2.

Referring initially to FIG. 2, wherein a present invention novel apparatus 70 for eliminating air bubbles from a liquid dispensing line is shown. The apparatus 70 includes components that are similar to those shown in FIG. 1, e.g., a first liquid reservoir 12, a buffer tank 22, air controlled solenoid valves 34 and 46, an electric pump 32, a filter 56, another air controlled solenoid valve 64 and a flow regulating (or suckback) valve 68. In the preferred embodiment, a novel apparatus of the present invention air bubble tank system 80 is added between the air controlled solenoid valves 34, 46 and the electric pump 32. The air bubble tank system 80 consists of an air bubble tank 82 which has a liquid inlet 84 and two liquid outlets 86, 88. An enlarged, perspective view of the air bubble tank 82 is shown in FIG. 3.

The air bubble tank 82, the inlet 84 and the outlets 86, 88 can be constructed of a suitable material that is resistant to most processing fluids used in semiconductor fabrication processes. It is desirable to construct these parts in a material such as Teflon or stainless steel so that the parts can be used to contain or to contact materials that are frequently of a corrosive nature. The tank 82 can be suitably mounted on brackets 92 and then on a process machine by mechanical means such as bolts 94.

The air bubble tank 82 functions in the following manner. When a liquid flow is fed into the tank through inlet 84, it substantially fills up the cavity 96 inside the tank 82. Based on the specific gravity difference, air bubbles tend to cumulate at an upper portion 98 of the cavity 96 while liquid tends to cumulate at a bottom portion 100 of the cavity 96. During normal operations, the bubbles accumulated in the upper portion 98 of the tank 82 can be exhausted out of the dispensing line by opening liquid outlet 86 for draining into a drain tank (not shown). The process can be carried out on a frequency that is necessary for eliminating all the air bubbles in the liquid dispensing line. For instance, it has been found that in the application of a photoresist solution, the liquid outlet 86 can be opened at a frequency of once a week to exhaust the air bubbles together with a small amount of the photoresist solution so that the photoresist dispensing line can be operated without air bubble problems. The frequency can be increased to accommodate an increasing amount of air bubbles accumulated in the cavity 82.

Optionally, a liquid level detection device (not shown) can be mounted on the side of the bubble tank 82 for a closed-loop monitoring of a threshold level of the liquid inside the tank. For instance, when the liquid level drops below the threshold level due to an excessive amount of air bubbles accumulated in the cavity 96, the level detector sends a signal to a control device which then shuts off the liquid outlet 88 and stop the operation of the liquid dispensing system. This will prevent the occurrence where a bubble tank 82 may be completely filled with air bubbles and that bubbles are flown out of the liquid outlet 88 onto a wafer surface and thus produces defective wafers. The liquid level detection device may also sense the liquid level when the air bubbles are exhausted out of the outlet 86 such that the liquid level raises above its threshold level. A signal is sent to the control system such that the delivery of the process liquid from outlet 88 to the surface of a wafer can be resumed.

It should be noted that while a photoresist solution dispensing system is used to illustrate the present invention novel method and apparatus, the broad applicability of the method and apparatus is in no way limited to a photoresist dispensing line. The method and apparatus can be utilized in any chemical delivery systems and are especially suitable in semiconductor fabrication processes.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A method for eliminating air bubbles from a liquid dispensing line comprising the steps of:

provenant a bubble tank connected downstream from a buffer tank having a top surface, a bottom surface generally parallel to the top surface, a cylindrical shaped sidewall connecting said top and bottom surfaces forming a fluid-tight enclosure;

providing a first liquid inlet and a first liquid outlet on said top surface, a second liquid outlet on or near said bottom surface of said bubble tank;

flowing a liquid flow containing air bubbles into said first liquid inlet to substantially fill a cavity inside said tank such that substantially all air bubbles cumulate in an upper portion of said cavity;

flowing a liquid flow substantially free of air bubbles out of said second liquid outlet for dispensing to a process machine; and venting said air bubbles cumulated in said upper portion of said cavity from said first liquid outlet out of said bubble tank.

2. A method according to claim 1, wherein said method is practiced in a semiconductor fabrication process.

3. A method according to claim 1, wherein said liquid flow is a semiconductor processing fluid.

4. A method according to claim 1, wherein said liquid flow is a photoresist solution.

5. A method according to claim 1, wherein said liquid flow substantially free of air bubbles is flown out of said second liquid outlet into a liquid circulating means.

6. A method according to claim 5, wherein said liquid circulating means is an electric pump.

7. A method according to claim 1, wherein said air bubbles are vented out of said bubble tank carried by a liquid flow into a drain tank.

8. A bubble tank for collecting air bubbles from a liquid comprising:

a tank having a top surface, a bottom surface and a sidewall defining a cavity contained therein for connecting downstream to a buffer tank, a liquid inlet positioned adjacent to said top surface of the tank for admitting liquid containing air bubbles into said cavity;

a first liquid outlet positioned adjacent to said bottom surface of the tank for outputting a liquid substantially without air bubbles; and a second liquid outlet positioned adjacent to said top surface of the tank for exhausting air bubbles.

9. A bubble tank according to claim 8, wherein said tank is connected in a process liquid supply line.

10. A bubble tank according to claim 8, wherein said liquid is a photoresist solution.

11. A bubble tank according to claim 8, wherein said liquid being flown into said tank is fed from two alternating liquid reservoirs.

12. A bubble tank according to claim 8, wherein said tank is capable of separating liquid from air bubbles contained in said liquid.

13. A bubble tank according to claim 8, wherein said tank is capable of storing liquid substantially without air bubbles in a lower portion of said cavity and storing air bubbles in an upper portion of said cavity.

14. An apparatus for eliminating air bubbles from a liquid dispensing line comprising:

a first passage for feeding a liquid containing air bubbles to a bubble tank through a first inlet positioned generally on top of said tank;

a bubble tank connected downstream from a buffer tank for holding a liquid and a quantity of air bubbles in a cavity, said liquid generally in a lower portion and said air bubbles generally in an upper portion of said cavity;

a first outlet positioned generally on top of said tank for exhausting air bubbles collected in said upper portion of said cavity; and a second fluid passage for drawing a liquid substantially free of air bubbles through a second outlet positioned generally near the bottom of the tank for dispensing to a process machine.

15. An apparatus according to claim 14, wherein said first fluid passage, said second fluid passage and said bubble tank are constructed of a corrosion-resistant material.

16. An apparatus according to claim 14, wherein said first fluid passage and said second fluid passage are removably connected to said first inlet and said second outlet, respectively.

17. An apparatus according to claim 14, wherein said liquid held in said bubble tank is a photoresistant solution.

18. An apparatus according to claim 14, wherein said liquid held in said bubble tank is a process liquid used in a semiconductor fabrication process.

* * * * *